US012603966B2

(12) United States Patent
Saito

(10) Patent No.: US 12,603,966 B2
(45) Date of Patent: Apr. 14, 2026

(54) IMAGE PROCESSING APPARATUS, CONTROL METHOD, AND STORAGE MEDIUM CAPABLE OF SUPPRESSING IMAGE DEGRADATION

(71) Applicant: CANON KABUSHIKI KAISHA, Tokyo (JP)

(72) Inventor: Wataru Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 18/486,085

(22) Filed: Oct. 12, 2023

(65) Prior Publication Data

US 2024/0129422 A1　　Apr. 18, 2024

(30) Foreign Application Priority Data

Oct. 18, 2022　(JP) ................................. 2022-166758

(51) Int. Cl.
　*G06T 7/90*　　(2017.01)
　*G06V 10/56*　　(2022.01)
　*H04N 1/60*　　(2006.01)

(52) U.S. Cl.
　CPC ................. *H04N 1/60* (2013.01); *G06T 7/90* (2017.01); *G06V 10/56* (2022.01); *G06T 2207/10024* (2013.01)

(58) Field of Classification Search
　CPC ............. H04N 1/60; G06T 7/90; G06V 10/56

USPC ................................. 382/167, 163, 164, 282
See application file for complete search history.

(56) References Cited

U.S. PATENT DOCUMENTS

2017/0039691 A1* 2/2017 Sugioka .................... G06T 3/40

FOREIGN PATENT DOCUMENTS

| JP | 2005-196444 | | 7/2005 |
| JP | 4999559 | B2 * | 8/2012 |
| JP | 2018107649 | A * | 7/2018 |

* cited by examiner

*Primary Examiner* — Jamares Q Washington
(74) *Attorney, Agent, or Firm* — Venable LLP

(57)　　　　ABSTRACT

A non-transitory computer readable storage medium acquires transmission information indicating a transparent state of each pixel of an image to be subjected to image processing and color information of each pixel of the image, acquiring a ratio of a region of a specific color to an entire region of the image by referencing the acquired color information, executing a first image processing based on color information of a first number of pixels in the image when the acquired ratio is less than a first threshold, and executing a second image processing based on color information of a second number of pixels, the second number obtained by deleting at least a portion of the region of the specific color in the image and less than the first number, when the acquired ratio is greater than or equal to the first threshold and is less than a second greater than the first.

23 Claims, 6 Drawing Sheets

IMAGE PROCESSING APPARATUS, CONTROL METHOD, AND STORAGE MEDIUM CAPABLE OF SUPPRESSING IMAGE DEGRADATION

CROSS-REFERENCE TO RELATED APPLICATION

This application claims the benefit of Japanese Patent Application No. 2022-166758, filed on Oct. 18, 2022, which is hereby incorporated by reference herein in its entirety.

Field of the Invention

The present invention relates to an image processing apparatus, a control method, and a storage medium.

Description of the Related Art

Conventionally, there are various kinds of image processing applications that automatically perform color adjustment of an image, person detection in the image, and the like, by analyzing the image. Some of these applications perform a color correction processing that corrects a color tone so as to brighten an entire region of an image, a region in which a person appears, or the like. When such an image processing is executed, Red/Green/Blue values (RGB values) of each pixel forming an image are extracted. Then, color information obtained (the RGB values) is inputted into various kinds of calculation formulas and algorithms, and RGB values after the image processing are outputted. Furthermore, the calculation formulas and the algorithms that are used in the image processing often use the RGB values of the entire region of the image and/or the RGB values of a peripheral region of pixel(s) to be processed as input parameters.

Conventionally, in order to make a portion of an image "completely transparent (fully transparent)" or "translucent (semi-transparent)", there is an image format that holds (retains) "transmission information (transparency information)". For example, portable network graphics (PNG) holds "an Alpha value" representing transparency in addition to RGB values. In PNG, normally, in the case that the Alpha value is "0", it is "completely transparent", in the case that the Alpha value is "the maximum value", it is "completely opaque (fully opaque)", and, in the case that the Alpha value is not these values ("0" and "the maximum value"), it is "translucent". By using "the transmission information", for example, by making corner regions of an image completely transparent, it becomes possible to form a round-shaped image and to execute screen display and/or printing. Furthermore, by making a background region of a photograph that photographs a person "completely transparent", it is also possible to form an image in which only the person is cut out. Moreover, there are also various kinds of applications that process an image by adding "the transmission information" to the image with respect to which these processes can be executed.

A pixel that is "translucent" holds color information such as RGB values that form an image, but the color information of a pixel to which "completely transparent" "transmission information" is added (hereafter, the pixel is referred to as "a completely transparent pixel") is undefined. Therefore, depending on the color content, image quality degradation after the image processing may occur. For example, there is a case when RGB values of pixels that are "completely transparent" are all filled with black that is "Red=0, Green=0, Blue=0". In order to correct the brightness of the entire image, in a case of executing an image processing that performs brighter correction as the number of pixels having a dark color is greater, the following is conceivable. That is, depending on a pixel that is not transparent (hereafter, referred to as "a non-transparent pixel"), it is conceivable that the color becomes white in which the values of Red, Green, and Blue are all maximum (for example, 255) and a portion of a non-transparent region or the entire non-transparent region becomes "blown-out highlights". In other words, even though it is visible to the naked eye, when the image is actually photographed (captured), a highlight portion (a bright portion) may come out as white. Therefore, according to a technique disclosed in Japanese Laid-Open Patent Publication (kokai) No. 2005-196444, an average value of the RGB values of "non-transparent pixels" is obtained, and the obtained average value is set to the RGB values of all "completely transparent pixels".

In recent years, in the image processing, a processing of suppressing image degradation (image deterioration) is required.

SUMMARY OF THE INVENTION

The present invention provides an image processing apparatus, a control method, and a storage medium capable of suppressing image degradation.

Accordingly, the present invention provides a non-transitory computer readable storage medium storing one or more computer-executable programs configured to be executed by one or more processors, the one or more computer-executable programs including instructions for acquiring transmission information indicating a transparent state of each pixel of an image to be subjected to an image processing and color information of each pixel of the image, acquiring a ratio of a region of a specific color to an entire region of the image by referring to the acquired color information in a case that the transmission information has been acquired from the image, performing control so as to execute a first image processing based on color information of a first number of pixels in the image in a case that the acquired ratio is less than a first threshold value, and performing control so as to execute a second image processing based on color information of a second number of pixels, the second number being obtained by deleting at least a portion of the region of the specific color in the image and less than the first number, in a case that the acquired ratio is greater than or equal to the first threshold value and is less than a second threshold value greater than the first threshold value.

According to the present invention, it is possible to achieve the effect of realizing the image processing that suppresses the image degradation.

Further features of the present invention will become apparent from the following description of exemplary embodiments with reference to the attached drawings.

BRIEF DESCRIPTION OF THE DRAWINGS

FIG. 1 is a configuration diagram of a system.

DESCRIPTION OF THE EMBODIMENTS

Figure 2:
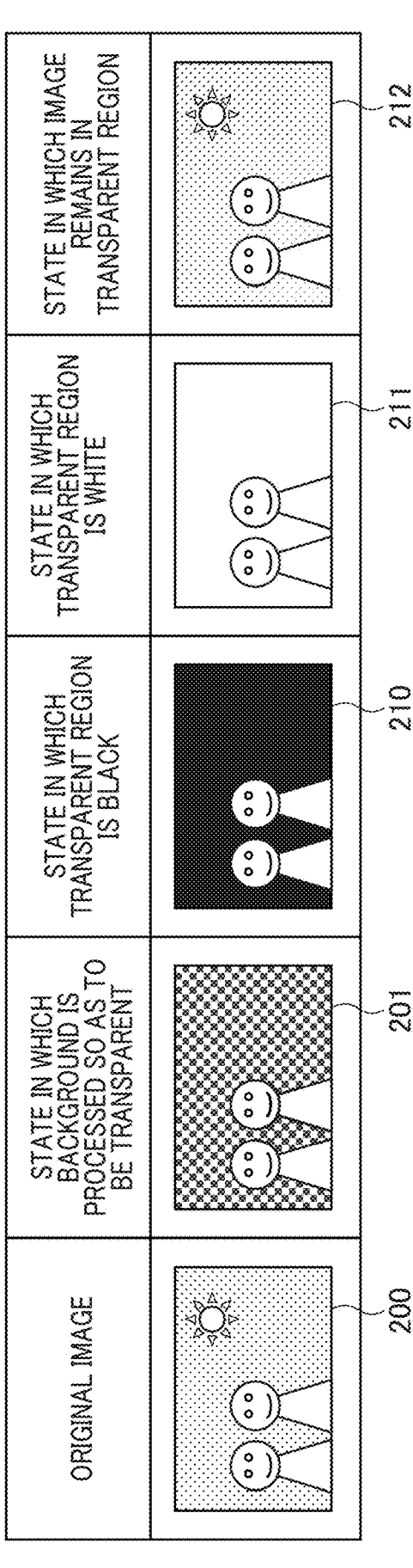
FIG. 2 is an explanatory diagram relating to a pattern of a transparent region.

The present invention will now be described in detail below with reference to the accompanying drawings showing embodiments thereof.

Hereafter, embodiments of the present invention will be described in detail with reference to the drawings. However, the configurations described in the following embodiments are merely examples, and the scope of the present invention is not limited by the configurations described in the following embodiments. First, a first embodiment of the present invention will be described.

Figure 1:
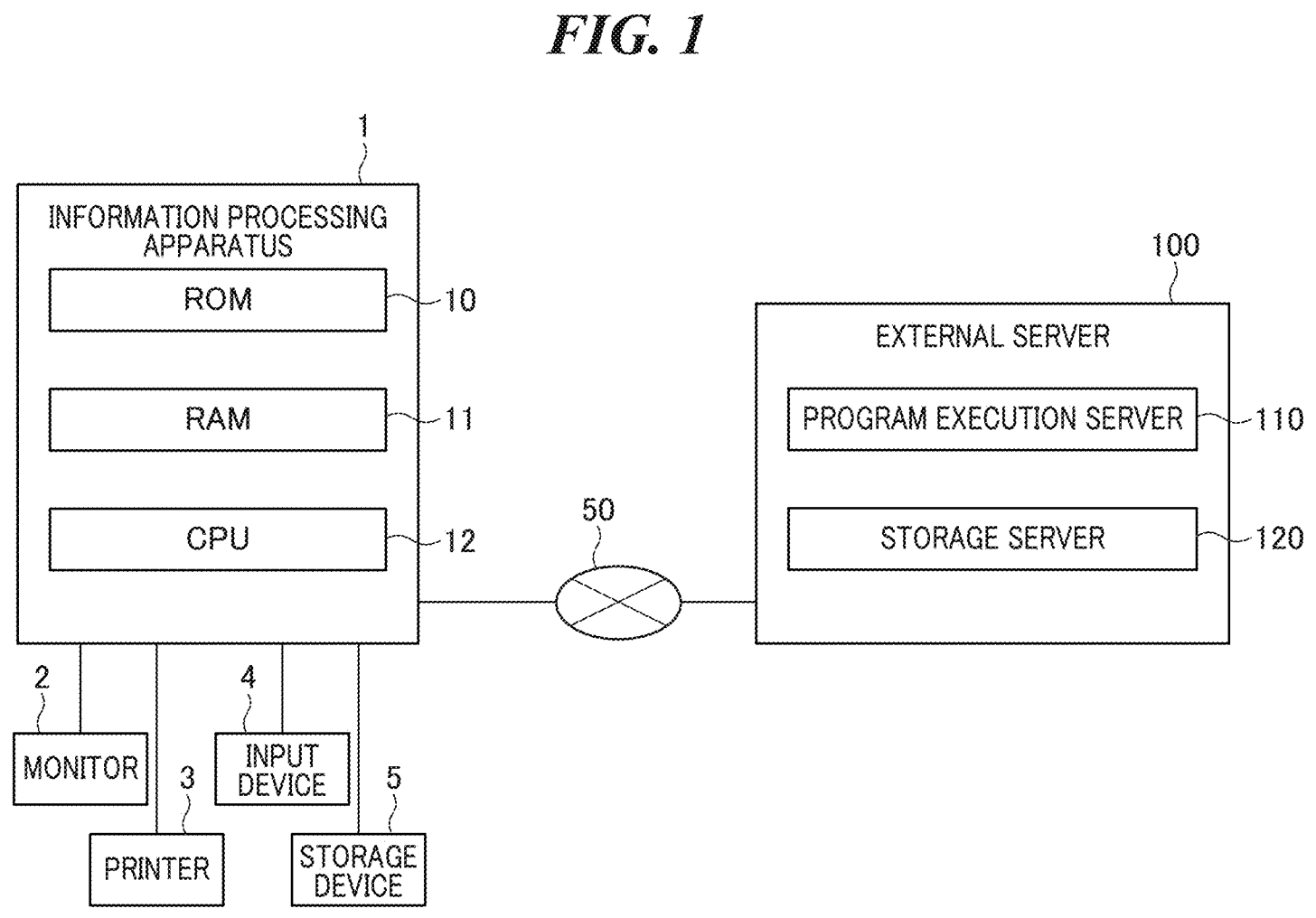

A configuration of a system (an information processing system) used in the first embodiment will be described with reference to FIG. 1. An information processing apparatus 1 has a function of analyzing an image inputted (an input image) and executing a predetermined image processing. The predetermined image processing is, for example, a correction processing that performs color correction of the image, or the like. As shown in FIG. 1, the information processing apparatus 1 includes a read only memory (ROM) 10, a random access memory (RAM) 11, and a central processing unit (CPU) 12. Furthermore, the information processing apparatus 1 includes an input/output interface (not shown) for connecting to a monitor 2, a printer 3, an input device 4, a storage device 5, and a network 50, and is able to be realized by, for example, one personal computer (PC). It should be noted that, in the first embodiment, since an external server 100 including a program execution server 110 performs an image processing, the external server 100 (or the program execution server 110) may be referred to as an image processing apparatus.

The CPU 12 performs overall control of the information processing apparatus 1 by executing an operating system program (hereafter, referred to as "an OS") stored in the storage device 5, the ROM 10, or the RAM 11. Furthermore, the CPU 12 executes a program stored in the ROM 10 to implement each function of the information processing apparatus 1. As a result, computation of necessary information, execution of processing, and control of each piece of hardware are performed. Various kinds of programs, and the like, are recorded in the ROM 10. The RAM 11 is a readable/writable random access memory, functions as a working memory of the CPU 12, and loads and stores each program read from the ROM 10.

The monitor 2 is a display device that displays an image outputted by the information processing apparatus 1. The printer 3 is a printing device that prints out the image outputted by the information processing apparatus 1. The input device 4 is an input device such as a keyboard and/or a pointing device for operating the information processing apparatus 1, and also has a function of importing an image from an external universal serial bus memory device (an external USB device), an external hard disk drive device (an external HDD device), or the like. Depending on the configuration aspect of the input device 4, the input device 4 may be integrated with the monitor 2, and may be configured to directly touch the monitor 2 to perform an input operation. The storage device 5 is a storage device such as an HDD or a solid state drive (an SSD) that stores the input images and images image-processed and outputted by the information processing apparatus 1.

In the configuration diagram shown in FIG. 1, the information processing apparatus 1, the monitor 2, the input device 4, and the storage device 5 are shown as separate devices (separate bodies). However, depending on the configuration aspect of the information processing apparatus 1, the monitor 2, the input device 4, and the storage device 5 (which may be shared with the RAM of the information processing apparatus 1) may be integrally configured. The network 50 is a communication network that communicably connects the information processing apparatus 1 and the external server 100. Examples of the network 50 include the Internet communication network, and the network 50 may be wired or wireless.

The external server 100 includes the program execution server 110 and a storage server 120. Furthermore, the external server 100 includes an input/output interface (not shown) for connecting to the network 50 such as the Internet. The program execution server 110 executes a part of the processing executed by the information processing apparatus 1 or an equivalent processing as necessary. Furthermore, the program execution server 110 provides a program to be displayed by a browser application of the information processing apparatus 1. The storage server 120 holds images transferred from the information processing apparatus 1 via the network 50 and/or images acquired from the external Internet via the network 50, for example, in the case that the capacity of the storage device 5 is small. The program execution server 110 and the storage server 120 may be realized by physically separate devices, or may be realized by one server device.

Here, an example of the problem of the technique disclosed in Japanese Laid-Open Patent Publication (kokai) No. 2005-196444 will be described. In the case that a region of "the completely transparent pixels" is wide, the average value of the RGB values of a large amount of "the non-transparent pixels" is inputted into an image processing calculation formula and/or the algorithm. As a result, there is a problem that a calculation load becomes enormous and the normal image processing cannot be performed. Furthermore, depending on the application that adds the above-described "transmission information", there are cases in which the RGB values are left in the transparent pixels just by adding only information about the Alpha value.

In the image processed in this way, the RGB values of "the completely transparent pixels" are replaced with the average value of "the non-transparent pixels", and an accurate image processing may not be performed. Therefore, there has been a demand for proposal of a method of preventing image degradation due to "the completely transparent pixels" when the image processing is performed on the basis of color information of an entire region of an image or color information of processing target pixels adjacent to a processing target.

Next, with reference to FIGS. 1 to 4, a processing of preventing the image degradation due to "the transmission information" when the image processing is performed on the basis of the information of the entire region of the image or the information of the processing target pixels will be described. FIG. 2 is an explanatory diagram of a screen that shows an original image, a state in which "the transmission information" is added, and color patterns of a transparent region. An image 200 is an "unprocessed" photograph (the original image) representing a photograph that photographs person(s). An image 201 represents a state in which a background of the person(s) is made "completely transparent" by the above-described image processing application.

An image 210 represents a state in which the RGB values of a transparent region of the image 201 are black with "Red=0, Green=0, Blue=0". An image 211 represents a state in which the RGB values of the transparent region of the image 201 are white with "Red=the maximum value, Green=the maximum value, Blue=the maximum value". An image 212 represents a state in which RGB values for forming the image (the original image) before the background is processed so as to be transparent remain in the RGB values of the transparent region of the image 201.

In the first embodiment, a solution processing example for the image 210 in which the transparent region is black will be described. Furthermore, in an image processing algorithm in the first embodiment, only the RGB values are used as an input parameter without including "the transmission information" such as an Alpha value. That is, it is assumed that correction calculation is performed on the basis of the brightness of the entire region of the image and the RGB values around the correction target pixels and image data of only the RGB values is outputted. Therefore, in the case that an algorithm that performs the image processing including "the transmission information" is used or in the case that an algorithm that outputs an image including "the transmission information" as a processing result is used, processes of S303 and S309 in FIG. 3 described below are unnecessary.

In such an image and such an image processing algorithm, a process in which the program execution server 110 performs the image processing with respect to the image including "the transmission information" will be described with reference to explanatory diagrams of FIGS. 2 and 4 and a flowchart of FIG. 3.

Figure 6:
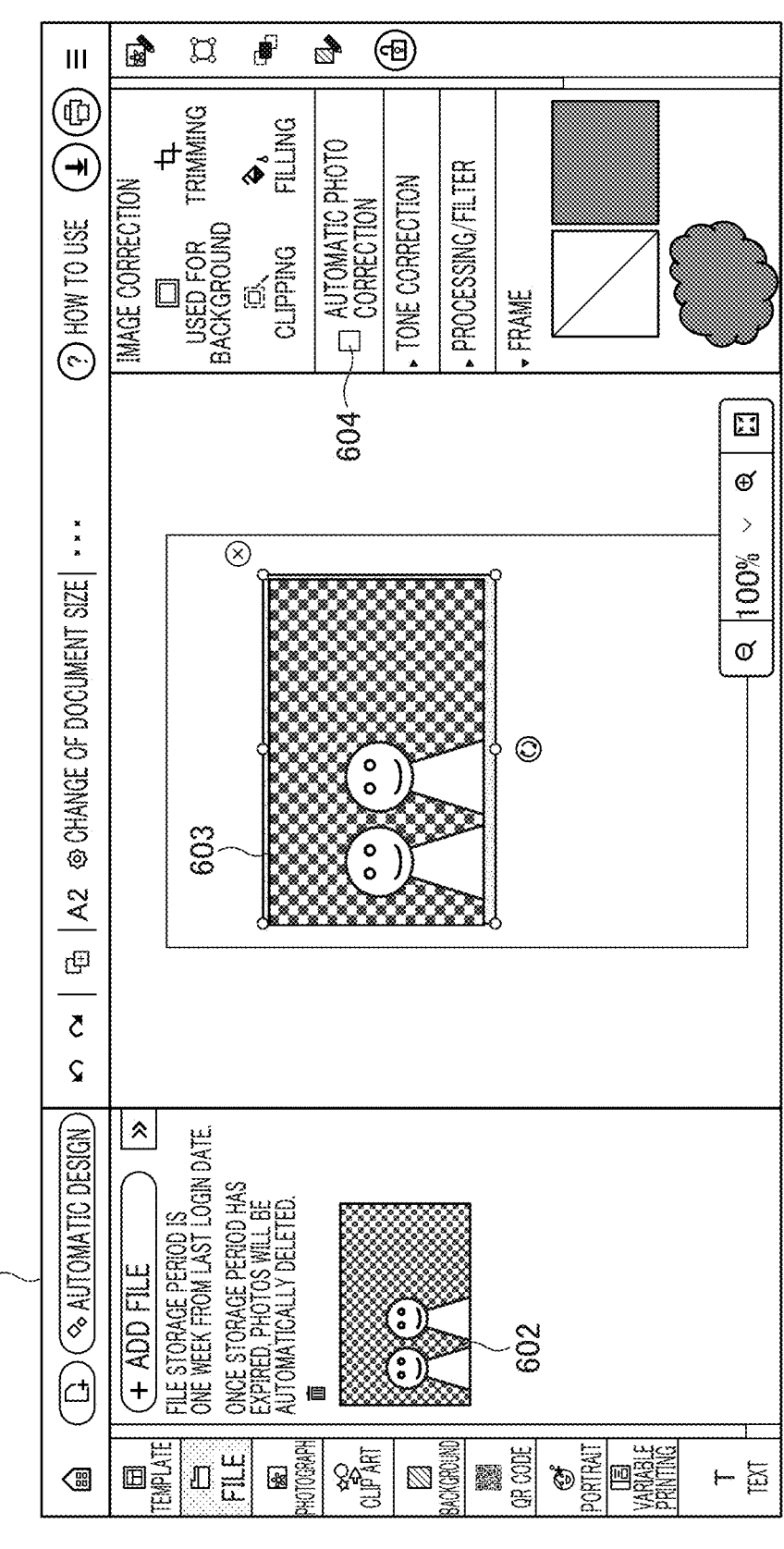
FIG. 6 is an explanatory diagram of a screen example of a monitor in a state where an image file to be corrected is inputted.

FIG. 6 shows a screen 601 of the monitor 2 in a state where an image file to be corrected is inputted. The screen 601 is displayed, for example, when the program execution server 110 provides a display program (for example, html) to the browser application of the information processing apparatus 1. An image 602 shows image data imported into the browser application. It should be noted that, in the case that a plurality of images (a plurality of pieces of image data) is imported into the browser application, thumbnail images of the plurality of pieces of image data are displayed. An image 603 is an image to be subjected to automatic photo correction. In the case that a user specifies a check box of automatic photo correction 604 within the screen 601 by checking, the flowchart of FIG. 3 is started. As described above, in the first embodiment, the flowchart of FIG. 3 is executed by the program execution server 110. Furthermore, in the first embodiment, the image data imported into the screen 601 is uploaded from the information processing apparatus 1 to the program execution server 110.

First, in S301, the program execution server 110 acquires "the transmission information" of each pixel of the input image. Here, "the transmission information" is information indicating a transparent state of a pixel of an image, such as "completely transparent", "completely opaque", or "translucent". It should be noted that, since the image data is uploaded to the program execution server 110 as described above, the program execution server 110 is able to execute each step (each process) in FIG. 3 by using the uploaded image data. The program execution server 110 scans all the pixels and acquires the Alpha value of each pixel. Next, in S302, the program execution server 110 determines the presence or absence of "the transmission information". For example, in the case that the program execution server 110 determines in S301 that there is no Alpha value (NO in S302), it is determined that "there is no transmission information". As another example, it is also possible to confirm from an image format. For example, the program execution server 110 determines that "there is no transmission information" in the case of the image data of a 24-bit RGB color model, and determines that "there is the transmission information" in the case of the image data of a 32-bit RGBA color model. Furthermore, as another example, in the case of an image format unique to the application capable of adding the transmission information, such as adding "the transmission information" to a CMYK color model, the program execution server 110 analyzes the image information such as the presence or absence of a transmission layer, and confirms the presence or absence of "the transmission information".

Figure 3:
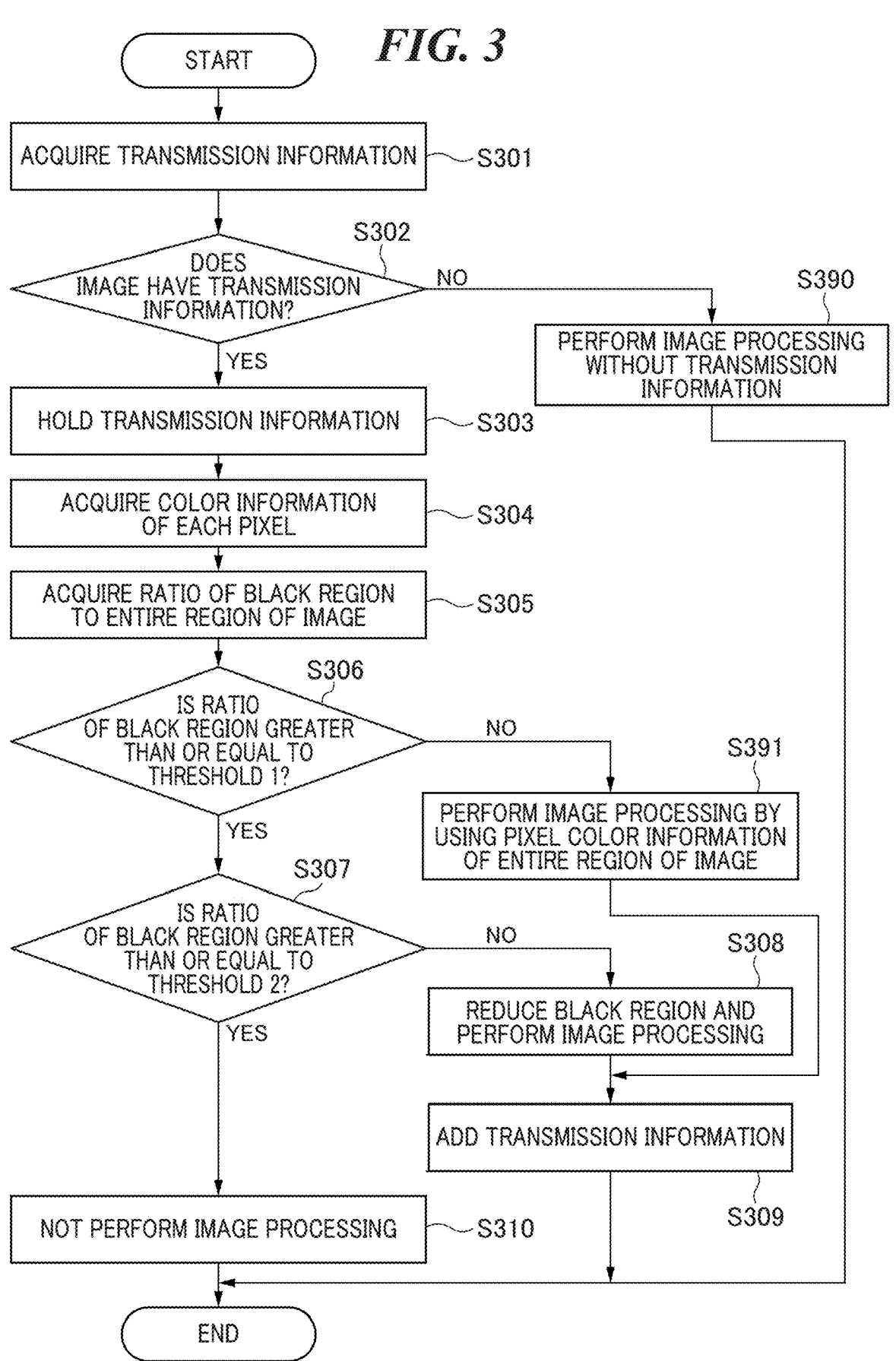
FIG. 3 is a flowchart that shows a processing of a first embodiment.
Figure 4:
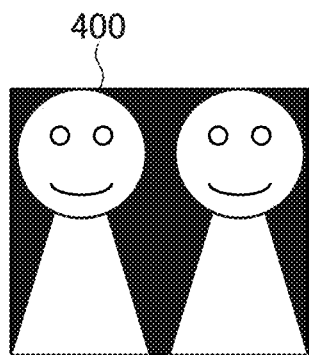
FIG. 4 is an explanatory diagram of the first embodiment.

In the case that the program execution server 110 determines that "there is no transmission information" (NO in S302), the processing of FIG. 3 proceeds to S390. Then, when the program execution server 110 outputs the image, which is obtained by executing the image processing for the image without "the transmission information", to the storage server 120, the flowchart of FIG. 3 ends. On the other hand, in the case that the program execution server 110 determines that "there is the transmission information" (YES in S302), the processing of FIG. 3 proceeds to S303. Hereafter, a case when the processing of FIG. 3 proceeds to S303 will be described.

In S303, the program execution server 110 holds "the transmission information", which is acquired in S301, in the storage server 120. Specifically, there is a method of holding a position or coordinates of a pixel in an image region and an Alpha value as one set. As another example, in the case that the Alpha value of each pixel included in the image is only the minimum value (completely transparent) or the maximum value (completely opaque), an image for Alpha value addition is created, an image file thereof is outputted, and the image file is held in the storage server 120. For example, an image processing library Pillow of Python or the like is used to extract only the Alpha values to create a grayscale image. This mask image will typically be black for "completely transparent" pixels and white for "completely opaque" pixels. As another example of the image for Alpha value addition, a binary mask image, in which a pixel of "completely transparent" is "0" and a pixel of "completely opaque" is "1", is created. In the case that the background is completely transparent and a human region is completely opaque in the image 201 of FIG. 2, the Alpha value of the pixel in the background region is the minimum value, and the Alpha value of the pixel in the human region is the maximum value. In this case, the Alpha value of each pixel included in the image 201 is only the minimum value or the maximum value. Therefore, the program execution server 110 creates an image for Alpha value addition in which the pixels in the background region are completely transparent and the pixels in the human region are completely opaque, and holds the image for Alpha value addition in the storage server 120.

Next, in S304, the program execution server 110 acquires color information of each pixel of the image from which "the transmission information" has been acquired. For example, the program execution server 110 scans each pixel and acquires color information such as the RGB values, a grayscale value, a monochrome binary value, CMYK values (Cyan/Magenta/Yellow/Key Plate values), and/or HSB values (hue/saturation/brightness values) according to the image processing algorithm and the image format. The program execution server 110 may acquire one or more of the RGB values, the grayscale value, the monochrome binary value, the CMYK values, and the HSB values according to one of the calculation formula, the algorithm, and the image format that are used in the image processing.

Next, in S305, the program execution server 110 obtains a ratio of a black region, which is "the completely transparent pixels", to the entire region of the image. Basically, the program execution server 110 refers to an acquisition result of the color information of each pixel in S304 to acquire a ratio of a region of a specific color to the entire region of the image. Specifically, the program execution server 110 scans the color information of all the pixels of the image data, obtains an accumulated value of "the number of black pixels" with "Red=0, Green=0, Blue=0", and obtains a ratio between the accumulated value and the number of all the pixels. At this time, in the case that it is not desired to include the black of "the non-transparent pixels" in the black region, even in the case of the black pixel with "Red=0, Green=0, Blue=0", when the Alpha value is not the minimum value (not "completely transparent"), it may not be included in the accumulation of the black pixels. For example, in FIG. 2, in the case that it is not desired to include the black region included in the human region, only the color information of each pixel of the background region is acquired as the accumulated value.

As another example of obtaining the ratio of the black region to the entire region of the image, there is also a method of obtaining the ratio of the black region to the entire region of the image from a frequency distribution. For example, in the case of the RGB values of 256 gradations, there are "16777216" patterns based on the calculation of "256×256×256". The frequency distribution of the RGB values of the entire region of the image is obtained with such patterns of all colors as classes, or with classes that have a range (width) of the RGB values such that "R=0 to 10, G=0 to 10, B=0 to 10" is one class. Furthermore, it is possible to obtain the ratio of the black region to the entire region of the image by obtaining the relative frequency of the class including "Red=0, Green=0, Blue=0".

Next, in S306, the program execution server 110 determines whether or not the ratio of the black region to the entire region of the image acquired in S305 is greater than or equal to a predetermined threshold (hereafter, referred to as "a threshold 1"). In the case that the program execution server 110 determines that the ratio of the black region to the entire region of the image is less than "the threshold 1" (NO in S306), the processing of FIG. 3 proceeds to S391. On the other hand, in the case that the program execution server 110 determines that the ratio of the black region to the entire region of the image is greater than or equal to "the threshold 1" (YES in S306), the processing of FIG. 3 proceeds to S307. Hereafter, a case when the processing of FIG. 3 proceeds to S391 will be described. In S391, the program execution server 110 performs the image processing by using the color information of the pixels of the entire region of the image, and then the processing of FIG. 3 proceeds to S309. In S309, when the program execution server 110 adds "the transmission information" held in S303 to the image on which the image processing has been performed (the details will be described below) and outputs the image to the storage server 120, a series of processes shown in the flowchart of FIG. 3 ends. It should be noted that, in a case of using an image processing algorithm in which image quality is likely to deteriorate due to the black region or other single color solid filling regions, it is preferable to set "the threshold 1" to a small value.

Hereafter, a case when the processing of FIG. 3 proceeds to S307 based on the determination in S306 will be described. In S307, the program execution server 110 determines whether or not the ratio of the black region to the entire region of the image acquired in S305 is greater than or equal to a predetermined threshold (hereafter, referred to as "a threshold 2"). It should be noted that "the threshold 2" is a value greater than "the threshold 1". In the case that the program execution server 110 determines that the ratio of the black region to the entire region of the image is less than "the threshold 2" (NO in S307), the processing of FIG. 3 proceeds to S308. On the other hand, in the case that the program execution server 110 determines that the ratio of the black region to the entire region of the image is greater than or equal to "the threshold 2" (YES in S307), the processing of FIG. 3 proceeds to S310.

Hereafter, a case when the processing of FIG. 3 proceeds to S308 based on the determination in S307 will be described. In S308, the program execution server 110 reduces (or deletes) the black region that is "the completely transparent pixel region" and executes the image processing. A first specific example (specific example 1) of S308 is to reduce an input amount of black to the calculation formula and the algorithm that are used in the image processing. For example, during the course of the algorithm, an average of the RGB values of the entire region of the image is usually calculated by dividing an RGB total value of all the pixels by the total number of pixels. However, in this process (S308), for example, the program execution server 110 calculates a frequency distribution (a histogram) of the color information described in S304, and reduces the frequency of the class indicating black to be less than or equal to an average value of the frequencies of the classes not including black. Then, the program execution server 110 calculates a total value number obtained by adding an RGB total value obtained by "reducing the total number of black region pixels" by using the histogram and an RGB total value of "the non-transparent pixels". Then, the program execution server 110 divides the calculated total value number by a subtraction value (the number of pixels after the subtraction) obtained by subtracting "the reduced number of the black region pixels" from the total number of pixels.

Furthermore, a second specific example (specific example 2) of S308 is not to input the black pixel into the calculation formula and the algorithm that are used in the image processing. For example, in the case of obtaining an average value of eight pixels surrounding a pixel to be processed (a processing target pixel) during the course of the algorithm, an average value excluding black from the eight pixels is obtained. Furthermore, a third specific example (specific example 3) of S308 is to cut out a rectangular region, which includes all "the non-transparent pixels" and has the minimum number of pixels in the black region, from the input image and perform the image processing. For example, there is a processing of cutting out the rectangular region so that the positions of the upper and lower ends and the left and right ends of "the non-transparent pixels" become an outline. More specifically, referring to FIG. 4, an image 400 is cut out as shown in the third specific example from the image 210 in FIG. 2. The program execution server 110 executes the same image processing as the above-described specific example 1 or the above-described specific example 2 with respect to the cut-out image 400 of FIG. 4. Thereafter, the program execution server 110 is able to restore the image to an image having the same width and height as the input image by superimposing the cut-out image subjected to the image processing on the input image at a cut-out position.

It should be noted that the amount of reducing the black region in S308 may be an amount by which the ratio of the black region to the entire region of the image becomes less than "the threshold 1" in S306, or may be an amount by which the ratio becomes less than or equal to a predetermined reduction ratio, such as 10% or less of the total number of "the non-transparent pixels". In this way, the program execution server 110 may reduce the number of the "completely transparent" pixels to a predetermined ratio and execute the image processing of S308. As a result, an average value in which the influence of black is suppressed can be obtained.

Next, in S309, the program execution server 110 adds "the transmission information" held in S303. Since the algorithm in the first embodiment outputs the image data of only the RGB values, it is necessary to restore "the transmission information". In the case of holding the position or the coordinates of the pixel in the image region and the Alpha value as one set, the program execution server 110 converts the image after the image processing into an image format capable of holding the Alpha value such as the RGBA color model. Thereafter, the program execution server 110 is able to restore "the transmission information" by setting an Alpha value corresponding to the position or the coordinates of each pixel. Here, a case when the program execution server 110 extracts only the Alpha values and creates a grayscale image for Alpha value addition will be described. In this case, the program execution server 110 is able to restore "the transmission information" by adding an Alpha value based on the pixel value of the grayscale image to the image after the image processing by using the image processing library Pillow of Python, or the like.

In the case that the binary mask image for Alpha value addition, in which the pixel of "completely transparent" is "0" and the pixel of "completely opaque" is "1", is created, the program execution server 110 copies the image after the image processing by using the image processing library Pillow of Python, or the like, and creates the image of the RGBA color model in which the "maximum" Alpha value is added to all the pixels. Then, the program execution server 110 is able to restore "the transmission information" by combining only a portion where the binary mask image is "1" with the image after the image processing. In this case, the pixel where the mask image is "1" has the Alpha value set to the "maximum" value, and the pixel where the mask image is "0" has the Alpha value set to the "minimum" value.

When the image in which "the transmission information" is restored is outputted to the storage server 120, the series of processes shown in the flowchart of FIG. 3 ends. It should be noted that the image outputted to the storage server 120 and subjected to the image processing is displayed on the browser application of the information processing apparatus 1. For example, the image 603 of FIG. 6 is displayed.

Hereafter, a case when the processing of FIG. 3 proceeds to S310 based on the determination in S307 will be described. In the case that the area of "the non-transparent region" is very small, it is considered that the image processing is impossible or unnecessary. The reason is that, for example, since the area of "the non-transparent pixels" is small, normal calculation cannot be performed due to lack of input data to the image processing algorithm. Furthermore, even in the case that the image processing is performed, it is conceivable that the effect of the image processing cannot be visually observed on an image processing result display of the monitor 2 or on a printing result of the printer 3. Therefore, in S310, the program execution server 110 outputs information indicating that the image processing has not been performed without performing the image processing. As a specific example, the program execution server 110 returns a notification of a message indicating that the image processing has not been performed, a preset response code of non-performed information indicating that the image processing has not been performed, or the like, to an activation source of the information processing apparatus 1. As another example, the program execution server 110 may output the uploaded image to the storage server 120 in an unprocessed state. When the process in S310 is completed, the series of processes shown in the flowchart of FIG. 3 ends.

It should be noted that "the threshold 2" is preferably set to a value that is able to secure the area of "the non-transparent region" that can be processed by the image processing algorithm. Alternatively, "the threshold 2" is preferably set to a value calculated from the monitor 2 that is able to secure an area in which a difference in color on "the non-transparent pixel" can be visually observed on the monitor display or on a print result, and a relationship between an output resolution of the printer 3 and "mm". Furthermore, "the threshold 2" is set to a value greater than "the threshold 1".

In the first embodiment, the description has been given on the assumption that all "the completely transparent pixels" are black, but even in the case that all "the completely transparent pixels" are another color such as white, it is possible to achieve similar effects by replacing the portion of black with the portion of the another color. Furthermore, in the case that "the completely transparent pixels" are multiple colors such as black and white, it is possible to achieve similar effects by repeating the processes of S305, S306, S307, and S308 of FIG. 3 by the number of colors of "the completely transparent pixels". However, in the case that the RGB values forming the original image remain in "the completely transparent pixels" as in the image 212 of FIG. 2, it is preferable to apply a second embodiment described below. It should be noted that the image processing shown in S391, S308, and S309 is, for example, an image correction processing such as various types of processes that are performed by analyzing the image and a color correction processing.

Figure 5:
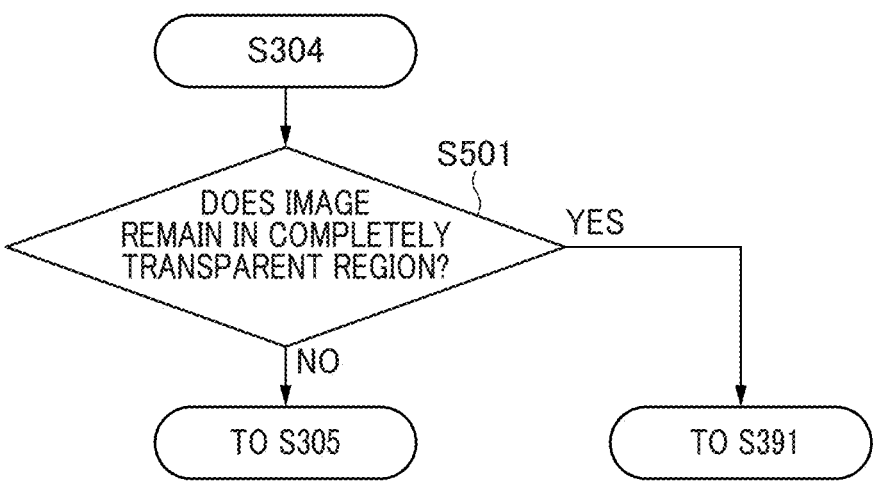
FIG. 5 is a flowchart that shows a processing of a second embodiment.

Next, the second embodiment will be described. With reference to FIGS. 3 and 5, a desirable image processing method in the case that the RGB values forming the original image such as a photograph remain in "the completely transparent pixels" as in the image 212 of FIG. 2 will be described. The flowchart shown in FIG. 5 starts when the program execution server 110 completes the process of S304 in the first embodiment. S501 is a process that is inserted between S304 and S305. First, in S501 of FIG. 5, the program execution server 110 determines whether or not the RGB values forming the original image, which is the image before "the transmission information" is added, remain in "the completely transparent pixels".

As a specific method, similar to the description of S305 of the first embodiment, in the case that a frequency distribution of the RGB values of the entire region of the image is generated and there is no class with outstanding generated frequencies, it is considered that all "the completely transparent pixels" are not black and white. Therefore, the program execution server 110 is able to determine that the original image remains. Here, "outstanding" means, for example, exceeding a specific threshold. Furthermore, as another specific method, in the case that there is information indicating that the processing has been performed by an application that does not change the RGB values when adding "the transmission information" to metadata of the input image, the program execution server 110 is able to determine that the RGB values forming the image remain in "the completely transparent pixels".

Furthermore, in the case that an application capable of adding "the transmission information" is installed, when the application adds "the transmission information", the RGB values will not be changed. As a result, when the processing of the first embodiment is executed, it may be determined that the RGB values forming the original image always remain in "the completely transparent pixels". Alternatively, in the case that the released application is implemented such that the RGB values will not be changed when "the transmission information" is added from a certain version, the version of the application is described in the metadata of the image at the same time. Furthermore, when the processing of the first embodiment is executed, the metadata is acquired, and the presence or absence of version information and the value of the version are confirmed.

As a result, it is possible to determine whether or not the RGB values forming the original image remain in "the completely transparent pixels". In the case that the program execution server 110 determines that the RGB values forming the original image remain in "the completely transparent pixels" (YES in S501), the processing proceeds to S391 of FIG. 3, and the image processing is performed by using the color information of the pixels of the entire region of the image. Therefore, it is possible to perform the image processing with the RGB values that form the original image of the entire region of the image, and it is possible to perform the accurate image processing. On the other hand, in the case that the program execution server 110 determines that the RGB values forming the image do not remain (NO in S501), the processing proceeds to S305, and the ratio of the color of "the completely transparent pixels" to the entire region of the image is obtained.

As described above, in the case that the color information forming the original image before transparency remains in the completely transparent pixels, the program execution server 110 can be configured to execute the image processing on the basis of the color information of all the pixels. Furthermore, in the case that the frequency distribution of the colors of all the pixels is obtained with reference to the acquired color information of each pixel and there is no color exceeding the specific threshold in the obtained frequency distribution, it is also possible to execute the image processing on the basis of the color information of all the pixels.

Next, a third embodiment will be described. In the embodiments described above, the aspect, in which the program execution server 110 executes the processing of FIGS. 3 and 5 and the browser application running on the information processing apparatus 1 displays the execution result, has been described. However, another aspect may be used. For example, the third embodiment can also be achieved by installing an application that executes FIGS. 3 and 5 in the information processing apparatus 1 and causing a processor such as the CPU 12 to read and execute a program code related to the application. In this case, it goes without saying that the program code itself and a recording medium on which the program code is recorded are also subject to the present invention. It should be noted that examples of the processor include a CPU, a micro-processing unit (MPU), and a digital signal processor (DSP). In this case, since the information processing apparatus 1 performs the image processing, the information processing apparatus 1 is referred to as an image processing apparatus.

Examples of the recording medium on which the program code is recorded include a flexible disk, a hard disk, an optical disk, a magneto-optical disk, a CD-ROM, a CD-R, a magnetic tape, a non-volatile memory card, a ROM, and a DVD. Furthermore, it is included in the present invention that various kinds of functions of the above-described embodiments are realized by only executing the program code read by a computer. The present invention also includes a case that the respective processes described in the first and second embodiments can be implemented by "an OS", "middleware", or the like, running on the computer performing a part or all of the actual processes on the basis of instructions of the program code.

Moreover, the program code read from the recording medium may be written in a memory included in a function extension board or a function extension unit inserted into the computer. In this case, the present invention also includes a case that a processor provided in the function extension board or the function extension unit performs a part or all of the actual processes on the basis of instructions of the program code to implement the functions of the first and second embodiments.

According to the first, the second, and the third embodiments described above, the apparatus acquires the transmission information indicating the transparent state of each pixel of the accepted image (S301: a first acquisition unit), and acquires the color information of each pixel of the image from which the transmission information has been acquired (S304: the first acquisition unit). Furthermore, in the case that the transmission information has been acquired in S301, the apparatus refers to the acquisition result in S304 to acquire the ratio of the region of the specific color to the entire region of the image (S305: a second acquisition unit). Then, in the case that the acquired ratio is less than a first threshold value (the threshold 1), the apparatus executes the image correction processing (a first image processing) such as the color correction processing on the basis of the color information of the pixels in the entire region of the image (S391). Furthermore, in the case that the acquired ratio is greater than or equal to the first threshold value and is less than a second threshold value (the threshold 2) greater than the first threshold value, the apparatus deletes at least a portion of the region of the color information and executes the image correction processing (a second image processing) such as the color correction processing (S308).

Furthermore, in the case that the acquired ratio is less than the first threshold value and is less than the second threshold value, the apparatus does not execute the image processing (S310). As a result, when the image correction processing, or the like, is performed on the basis of the color information of the entire region of the image or the color information of the peripheral region of the processing target pixel, it becomes possible to prevent image degradation such as blown-out highlights due to the transmission information.

Next, modifications of the present invention will be described. (Modification 1) In the above-described embodiments, the information processing apparatus 1 configured by one PC, or the like, is used, but a mobile terminal (a smartphone, a tablet terminal, or the like) may be used instead of the information processing apparatus 1. For this purpose, for example, a dedicated application may be downloaded from a specific site and may be installed. This dedicated application is able to execute the series of processes shown in FIG. 3. The monitor 2 and the input device 4 correspond to a display screen of the mobile terminal, and the storage device 5 corresponds to a flash memory, or the like, that is built in the mobile terminal. (Modification 2) In the case that the plurality of images is imported, the thumbnail images are displayed on the left side of the screen 601 of FIG. 6, but thumbnail images of the images subjected to the image processing may also be displayed on the right side of the screen 601. Furthermore, it is also possible to display a specific button for manually changing "the threshold 1" and "the threshold 2" on the screen 601, and to appropriately change both the thresholds by operating this specific button.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions.

The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A non-transitory computer readable storage medium storing one or more computer-executable programs configured to be executed by one or more processors, the one or more computer-executable programs including instructions for:

acquiring transmission information indicating a transparent state of each pixel of an image to be subjected to image processing and color information of each pixel of the image;

acquiring a ratio of a region of a specific color to an entire region of the image by referring to the acquired color information in a case that the transmission information has been acquired from the image;

performing control so as to execute a first image processing based on color information of a first number of pixels in the image in a case that the acquired ratio is less than a first threshold value; and performing control so as to execute a second image processing based on color information of a second number of pixels, the second number being obtained by deleting at least a portion of the region of the specific color in the image and less than the first number, in a case that the acquired ratio is greater than or equal to the first threshold value and is less than a second threshold value greater than the first threshold value.

2. The non-transitory computer-readable storage medium according to claim 1, wherein the first number is a number of pixels in the entire region of the image.

3. The non-transitory computer-readable storage medium according to claim 1, wherein the first image processing and the second image processing are image correction processing including a color correction processing.

4. The non-transitory computer-readable storage medium according to claim 1, wherein the one or more computer-executable programs include instructions for performing control so as not to execute a color correction processing on the image in a case that the acquired ratio is greater than or equal to the second threshold value.

5. The non-transitory computer-readable storage medium according to claim 1, wherein the transmission information is an Alpha value of a pixel in the image.

6. The non-transitory computer-readable storage medium according to claim 1, wherein the color information includes one or more from among RGB values, a grayscale value, a monochrome binary value, CMYK values, and HSB values according to one of a calculation formula, an algorithm, and an image format that are used in the image processing.

7. The non-transitory computer-readable storage medium according to claim 1, wherein the second number is a number of pixels in a range obtained by cutting out a rectangular region, which includes all non-transparent pixels and has a minimum number of pixels of the specific color, from the image.

8. The non-transitory computer-readable storage medium according to claim 1, wherein the one or more computer-executable programs include instructions for performing control so as to execute the first image processing in a case that there is no color exceeding a specific threshold in a frequency distribution of colors of all pixels in the image, the frequency distribution being obtained based on the acquired color information.

9. The non-transitory computer-readable storage medium according to claim 1, wherein the one or more computer-executable programs include instructions for adding the acquired transmission information to each corresponding pixel after execution of the first image processing or the second image processing.

10. A non-transitory computer readable storage medium storing one or more computer-executable programs configured to be executed by one or more processors, the one or more computer-executable programs including instructions for:

acquiring transmission information indicating a transparent state of each pixel of an image to be subjected to image processing and color information of each pixel of the image;

acquiring a ratio of a completely transparent region to an entire region of the image based on the acquired transmission information;

performing control so as to execute a first image processing based on color information of a first number of pixels in the image in a case that the acquired ratio is less than a first threshold value; and performing control so as to execute a second image processing based on color information of a second number of pixels, the second number being obtained by deleting at least a portion of the completely transparent region in the image and less than the first number, in a case that the acquired ratio is greater than or equal to the first threshold value and is less than a second threshold value greater than the first threshold value.

11. The non-transitory computer-readable storage medium according to claim 10, wherein the first number is a number of pixels in the entire region of the image.

12. The non-transitory computer-readable storage medium according to claim 10, wherein the first image processing and the second image processing are image correction processing including a color correction processing.

13. The non-transitory computer-readable storage medium according to claim 10, wherein the one or more computer-executable programs include instructions for performing control so as not to execute a color correction processing on the image in a case that the acquired ratio is greater than or equal to the second threshold value.

14. The non-transitory computer-readable storage medium according to claim 10, wherein the transmission information is an Alpha value of a pixel in the image.

15. The non-transitory computer-readable storage medium according to claim 10, wherein the color information includes one or more from among RGB values, a grayscale value, a monochrome binary value, CMYK values, and HSB values according to one of a calculation formula, an algorithm, and an image format that are used in the image processing.

16. The non-transitory computer-readable storage medium according to claim 10, wherein the second number is a number obtained by reducing completely transparent pixels to a predetermined ratio.

17. The non-transitory computer-readable storage medium according to claim 10, wherein the second number is a number of remaining pixels obtained by deleting all completely transparent pixels.

18. The non-transitory computer-readable storage medium according to claim 10, wherein the one or more computer-executable programs include instructions for performing control so as to execute the first image processing in a case that color information before the transmission information is added to the image remains in completely transparent pixels of the image.

19. The non-transitory computer-readable storage medium according to claim 10, wherein the one or more computer-executable programs include instructions for adding the acquired transmission information to each corresponding pixel after execution of the first image processing or the second image processing.

20. An image processing apparatus comprising:

at least one memory and at least one processor and/or at least one circuit that function as:

a first acquisition unit that acquires transmission information indicating a transparent state of each pixel of an image to be subjected to image processing and color information of each pixel of the image;

a second acquisition unit that acquires a ratio of a region of a specific color to an entire region of the image by referring to the acquired color information in a case that the transmission information has been acquired from the image; and a control unit that performs control so as to execute a first image processing based on color information of a first number of pixels in the image in a case that the acquired ratio is less than a first threshold value, and performs control so as to execute a second image processing based on color information of a second number of pixels, the second number being obtained by deleting at least a portion of the region of the specific color in the image and less than the first number, in a case that the acquired ratio is greater than or equal to the first threshold value and is less than a second threshold value greater than the first threshold value.

21. An image processing apparatus comprising:

at least one memory and at least one processor and/or at least one circuit that function as:

a first acquisition unit that acquires transmission information indicating a transparent state of each pixel of an image to be subjected to image processing and color information of each pixel of the image;

a second acquisition unit that acquires a ratio of a completely transparent region to an entire region of the image based on the acquired transmission information; and a control unit that performs control so as to execute a first image processing based on color information of a first number of pixels in the image in a case that the acquired ratio is less than a first threshold value, and performs control so as to execute a second image processing based on color information of a second number of pixels, the second number being obtained by deleting at least a portion of the completely transparent region in the image and less than the first number, in a case that the acquired ratio is greater than or equal to the first threshold value and is less than a second threshold value greater than the first threshold value.

22. A method for controlling an image processing apparatus, the method comprising:

acquiring transmission information indicating a transparent state of each pixel of an image to be subjected to image processing and color information of each pixel of the image;

acquiring a ratio of a region of a specific color to an entire region of the image by referring to the acquired color information in a case that the transmission information has been acquired from the image;

performing control so as to execute a first image processing based on color information of a first number of pixels in the image in a case that the acquired ratio is less than a first threshold value; and performing control so as to execute a second image processing based on color information of a second number of pixels, the second number being obtained by deleting at least a portion of the region of the specific color in the image and less than the first number, in a case that the acquired ratio is greater than or equal to the first threshold value and is less than a second threshold value greater than the first threshold value.

23. A method for controlling an image processing apparatus, the method comprising:

acquiring transmission information indicating a transparent state of each pixel of an image to be subjected to image processing and color information of each pixel of the image;

acquiring a ratio of a completely transparent region to an entire region of the image based on the acquired transmission information;

performing control so as to execute a first image processing based on color information of a first number of pixels in the image in a case that the acquired ratio is less than a first threshold value; and performing control so as to execute a second image processing based on color information of a second number of pixels, the second number being obtained by deleting at least a portion of the completely transparent region in the image and less than the first number, in a case that the acquired ratio is greater than or equal to the first threshold value and is less than a second threshold value greater than the first threshold value.

* * * * *